US011718564B2

United States Patent
Pfeil et al.

(10) Patent No.: US 11,718,564 B2
(45) Date of Patent: Aug. 8, 2023

(54) TWO-COMPONENT INORGANIC INJECTION MORTAR SYSTEM BASED ON FINE ALUMINOUS CEMENT HAVING INCREASED LOAD VALUES

(71) Applicant: Hilti Aktiengesellschaft, Schaan (LI)

(72) Inventors: Armin Pfeil, Kaufering (DE); Markus Schönlein, Gilching (DE); Dirk Volkmer, Aichach-Klingen (DE); Pascal Beroll, Weil (DE)

(73) Assignee: Hilti Aktiengesellschaft, Schaan (LI)

( * ) Notice: Subject to any disclaimer, the term of this patent is extended or adjusted under 35 U.S.C. 154(b) by 289 days.

(21) Appl. No.: 17/283,608

(22) PCT Filed: Oct. 2, 2019

(86) PCT No.: PCT/EP2019/076706
§ 371 (c)(1),
(2) Date: Apr. 8, 2021

(87) PCT Pub. No.: WO2020/074348
PCT Pub. Date: Apr. 16, 2020

(65) Prior Publication Data
US 2021/0380481 A1 Dec. 9, 2021

(30) Foreign Application Priority Data

Oct. 10, 2018 (EP) .................................. 18199506

(51) Int. Cl.
*C04B 28/06* (2006.01)
*C04B 111/00* (2006.01)

(52) U.S. Cl.
CPC ... *C04B 28/065* (2013.01); *C04B 2111/00715* (2013.01)

(58) Field of Classification Search
CPC ......... C04B 28/065; C04B 2111/00715; C04B 2103/0008; C04B 28/06; C04B 7/527
See application file for complete search history.

(56) References Cited

U.S. PATENT DOCUMENTS

| 4,352,693 | A | 10/1982 | Langdon |
| 11,214,519 | B2 | 1/2022 | Falger et al. |
| 11,214,526 | B2 | 1/2022 | Pfeil et al. |
| 2018/0050963 | A1 | 2/2018 | Hesse et al. |
| 2018/0251404 | A1 | 9/2018 | Pfeil et al. |
| 2018/0282217 | A1 | 10/2018 | Falger et al. |
| 2018/0305265 | A1 | 10/2018 | Pfeil et al. |
| 2019/0276364 | A1 | 9/2019 | Sautreuil et al. |

FOREIGN PATENT DOCUMENTS

| CN | 108137423 | 6/2018 | |
| CN | 108137425 | 6/2018 | |
| EP | 0 033 246 | 8/1981 | |
| EP | 1 614 670 | 1/2006 | |
| JP | 10-324848 | 12/1998 | |
| JP | 2009-132808 | 6/2009 | |
| WO | 2016/142339 | 9/2016 | |
| WO | 2017/067951 | 4/2017 | |
| WO | WO-2017067952 A1 * | 4/2017 | ............. C04B 28/06 |
| WO | WO-2017067953 A1 * | 4/2017 | ............. C04B 14/28 |
| WO | 2018/083010 | 5/2018 | |

OTHER PUBLICATIONS

U.S. Appl. No. 17/283,596, filed Apr. 8, 2021, Pfeil et al.
U.S. Appl. No. 17/283,633, filed Apr. 8, 2021, Pfeil et al.
U.S. Appl. No. 17/283,642, filed Apr. 8, 2021, Pfeil et al.
International Search Report dated Nov. 19, 2019 in PCT/EP2019/076706, 4 pages.
Written Opinion dated Nov. 19, 2019 in PCT/EP2019/076706, 6 pages.
Kerneos Aluminate Technologies, "Product Data Sheet: Ternal White", Sep. 15, 2006, pp. 1-2, Neuilly sur Seine, France.
Haifeng LV et al, "Use of Powder Sorting Machine and Energy Saving of Grinding" China Building Materials Industry Press, Dec. 2017, with English translation 17 pages.

* cited by examiner

*Primary Examiner* — Anthony J Green
(74) *Attorney, Agent, or Firm* — Grüneberg and Myers, PLLC

(57) ABSTRACT

A two-component inorganic injection mortar system includes a curable aqueous-phase aluminous cement component A and an initiator component B in aqueous-phase for initiating the curing process. Component A includes at least one blocking agent which is phosphoric acid, metaphosphoric acid, phosphorous acid or phosphonic acid, at least one plasticizer and water. Component B includes an initiator, at least one retarder, at least one mineral filler and water. The curable aqueous-phase aluminous cement component A includes calcium aluminate cement having an average particle size in the range of from 0.5 to 15 μm. A two-component system, which is ready-for-use, can be used for chemical fastening of anchors, such as metal elements, or in mineral substrates, such as structures made of brickwork, concrete, pervious concrete or natural stone.

14 Claims, No Drawings

US 11,718,564 B2

TWO-COMPONENT INORGANIC INJECTION MORTAR SYSTEM BASED ON FINE ALUMINOUS CEMENT HAVING INCREASED LOAD VALUES

CROSS-REFERENCE TO RELATED APPLICATIONS

This application is a National Stage entry under § 371 of International Application No. PCT/EP2019/076706, filed on Oct. 2, 2019, and which claims the benefit of European Application No, 18199506.9, filed on Oct. 10, 2018. The content of each of these applications is hereby incorporated by reference in their entirety.

FIELD OF THE INVENTION

The present invention pertains to a two-component inorganic injection mortar system based on fine aluminous cement for chemical fastening of anchors and post-installed reinforcing bars in mineral substrates, comprising a curable aqueous-phase aluminous cement component A and an initiator component B in aqueous-phase for initiating the curing process, component A further comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water, characterized in that the curable aqueous-phase aluminous cement component A comprises calcium aluminate cement having an average particle size in the range of from 0.5 to 15 μm. Moreover, the present invention pertains to the use of calcium aluminate cement having an average particle size in the range of from 0.5 to 15 μm in an inorganic injection mortar system for a chemical fastening of anchors and post-installed reinforcing bars in mineral substrates, comprising a curable aqueous-phase aluminous cement component A and an initiator component B in aqueous-phase for initiating the curing process to increase load values.

BACKGROUND OF THE INVENTION

Many mortar systems exist which provide a good chemical fastening of anchors and post-installed reinforcing bars in mineral substrates or surfaces. For example, organic systems based on free-radically polymerizable resins are used when fast curing is desired. However, such systems are generally known to be polluting, expensive, potentially hazardous and/or toxic for the environment and for the person who handles them and they often need to be specifically labelled. Moreover, organic systems often show a much reduced stability when thermally exposed to strong sunlight or otherwise elevated temperatures, such as fire, thereby decreasing their mechanical performance when it comes to chemically fastening of anchors and post-installed reinforcing bars.

When it comes to chemically fastening anchors and post-installed reinforcing bars in mineral substrates, most of the known systems lack sufficient fluidity for most practical applications of the resultant anchoring compositions. Often such prior art compositions also evidence a tendency to crack in a relatively short time or do not exhibit the required mechanical performance, in particular under certain conditions such as under the influence of elevated temperatures, in different conditioned boreholes as well as over a long period of time. Moreover, known systems tend to exhibit a large extend of shrinkage when applied in a borehole which results in an insufficient anchoring of the anchors and post-installed reinforcing bars.

Therefore, there is a need for an inorganic injection mortar system, preferably a two-component inorganic injection mortar system, which is superior over the prior art systems. In particular, it is of interest to provide a system that can be used for a chemical fastening of anchors and post-installed reinforcing bars in mineral substrates without adversely affecting the handling, characteristics and the mechanical performance of the chemical anchoring system. Especially, there is a need for a system that provides increased load values when compared to the known systems. In addition, there is a need to improve load values by the addition of fine particles materials, to lower the consumption of more expensive binder material or to improve some properties of the mixed materials. In particular, there is a need for a system, which is easy to apply in slurry, pasty or liquid form and which is at the same time stable over a certain period of time to be stored and which is in particular suitable for post-installing reinforcing bars.

In view of the above, it is an object of the present invention to provide an inorganic injection mortar system, in particular a two-component inorganic injection mortar system, which overcomes the disadvantages of the prior art systems. In particular, it is an object to provide a two-component inorganic injection mortar system that is ready-for-use, which can be handled easily and is eco-friendly, which can be stably stored for a certain period of time prior to use, which exhibits a good balance between setting and hardening and still has an excellent mechanical performance when it comes to chemically fastening anchors and post-installed reinforcing bars. Especially to provide a system that has at the same time increased load values when compared to the known systems.

Moreover, it is an object of the present invention to provide a method for a chemical fastening of anchoring means, preferably of metal anchors and post-installed reinforcing bars, in mineral substrates, such as structures made of brickwork, concrete, pervious concrete or natural stone.

These and other objectives as they will become apparent from the ensuring description of the invention are solved by the present invention as described in the embodiments below. The below description includes descriptions of preferred embodiments.

SUMMARY OF THE INVENTION

In one aspect, the present invention provides a ready-for-use two-component inorganic injection mortar system comprising a curable aqueous-phase aluminous cement component A and an initiator component B in aqueous-phase for initiating the curing process, component A further comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water, which is characterized in that the curable aqueous-phase aluminous cement component A comprises calcium aluminate cement having an average particle size in the range of from 0.5 to 15 μm.

In another aspect, the present invention pertains to a use of calcium aluminate cement having an average particle size in the range of from 0.5 to 15 μm in a two-component inorganic injection mortar system for a chemical fastening of anchors and post-installed reinforcing bars in mineral substrates, comprising a curable aqueous-phase aluminous cement component A and an initiator component B for initiating the curing process, to increase load values.

In another aspect, the present invention provides a two-component inorganic injection mortar system that is used for chemical fastening of anchoring means, preferably of metal elements, in mineral substrates, such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO \cdot Al_2O_3$, or CA in the cement chemist notation).

The term "shelf life" in the context of the present invention refers to the time during which a component stays in the form of a more or less fluid aqueous suspension of solid products, capable of coming back to the aqueous-suspension by mechanical means, without setting or losing its reactivity.

The term "initiator" in the context of the present invention refers to a compound or composition that modifies the chemical environment to start a particular chemical reaction. In the present invention the initiator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "initial set-time" in the context of the present invention refers to the time at which the mixture of component A and component B starts to set after mixing. During the time period after mixing, the mixture stays in the form of a more or less fluid aqueous suspension or paste of solid products.

It has been surprisingly found out by the inventors, that the addition of a calcium aluminate cement having an average particle size in the range of from 0.5 to 15 µm to an inorganic injection mortar system for a chemical fastening of anchors and post-installed reinforcing bars in mineral substrates, comprising a curable aqueous-phase aluminous cement component, results in a significant increase of load values when compared to a system not comprising any calcium aluminate cement having an average particle size in the range of from 0.5 to 15 µm. It has also been found out that the addition of a fine calcium aluminate cement does not adversely affecting the handling, characteristics and the mechanical performance of the chemical anchoring system.

Therefore, the present invention pertains to a two-component inorganic injection mortar system for chemical fastening of anchoring means in mineral substrates, comprising a curable aqueous-phase aluminous cement component A and an initiator component B in aqueous-phase for initiating the curing process. In particular, according to the present invention, component A further comprises at least one blocking agent selected from the group consisting of phosphoric acid, metaphosphoric acid, phosphorous acid and phosphonic acids, at least one plasticizer and water, and component B comprises an initiator, at least one retarder, at least one mineral filler and water, characterized in that the curable aqueous-phase aluminous cement component A comprises calcium aluminate cement having an average particle size in the range of from 0.5 to 15 µm.

Component A according to the present invention is based on an aqueous-phase aluminous cement (CA) or an aqueous-phase calcium sulfoaluminate cement (CAS). The calcium aluminate cement which can be used in the present invention is characterized by rapid set and rapid hardening, rapid drying and shrinkage compensation when mixed with calcium sulfates, excellent resistance to corrosion and shrinkage. Such a calcium aluminate cement suitable to be used in the present invention is for example Ternal® White (Kerneos, France).

If component A comprises a mixture of aluminous cement (CAC) and calcium sulfate ($CaSO_4$), rapid ettringite formation takes place during hydration. In concrete chemistry hexacalcium aluminate trisulfate hydrate, represented by the general formula $(CaO)_6(Al_2O_3)(SO_3)_3 \cdot 32\ H_2O$ or $(CaO)_3(Al_2O_3)(CaSO_4)_3 \cdot 32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A of the present invention comprises at least about 10 wt.-%, preferably at least about 20 wt.-%, more preferably at least about 30 wt.-%, most preferably at least about 40 wt.-%, from about 10 wt.-% to about 95 wt.-%, preferably from about 20 wt.-% to about 90 wt.-%, more preferably from about 30 wt.-% to about 85 wt.-%, most preferably from about 40 wt.-% to about 80 wt.-% of aluminous cement, based on the total weight of component A.

According to an alternative embodiment of the invention, component A comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component inorganic injection mortar system of the present invention, the ratio of $CaSO_4/CAC$ of component A should be less or equal to 35:65.

The fine calcium aluminate cement used in the present invention having an average particle size in the range of from 0.5 to 15 µm used in the two-component inorganic injection mortar system for a chemical fastening of anchors and post-installed reinforcing bars in mineral substrates according to the present invention, is preferably in the form of milled, grinded or otherwise finest calcium aluminate cement.

In a particular preferred embodiment, the calcium aluminate cement having an average particle size (d50%) in the range of from 0.5 to 10 µm, more preferably of from 2 to 8 µm, most preferably has an average particle size in the range of from 3 to 6 µm.

The fine calcium aluminate cement used in the present invention is commercially available, for example Ternal® White (Kerneos, France), which has to be milled to the corresponding particle size, or any calcium aluminate cement having an average particle size in the range of from 0.5 to 15 µm.

The calcium aluminate cement having an average particle size in the range of from 0.5 to 15 µm used according to the present invention, is comprised in the curable aqueous-phase aluminous cement component A of the two-component inorganic injection mortar system. The addition of calcium aluminate cement having an average particle size in the range of from 0.5 to 15 µm to the inorganic injection mortar system, lowers the consumption of more expensive binder material and improves some properties of the mixed material, especially results in an increase of load values.

Component A of the present invention comprises at least about 10 wt.-%, preferably at least about 20 wt.-%, more preferably at least about 30 wt.-%, most preferably at least about 40 wt.-%, from about 10 wt.-% to about 90 wt.-%, preferably from about 20 wt.-% to about 80 wt.-%, more preferably from about 30 wt.-% to about 75 wt.-%, most preferably from about 40 wt.-% to about 70 wt.-% of calcium aluminate cement having an average particle size in the range of from 0.5 to 15 µm, based on the total weight of the aluminous cement.

It is particular preferred that the calcium aluminate cement having an average particle size of 6 µm is present in the range of from about 10 wt.-% to 90 wt.-%, preferably from about 20 wt.-% to 80 wt.-%, more preferably from about 30 wt.-% to 75 wt.-%, most preferably from about 40 wt.-% to 70 wt.-%, based on the total weight of the aluminous cement.

The blocking agent comprised in component A according to the present invention is selected from the group consisting of phosphoric acid, metaphosphoric acid, phosphorous acid and phosphonic acids, preferably is phosphoric acid or metaphosphoric acid, most preferably is phosphoric acid, in particular a 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

The plasticizer comprised in component A according to the present invention is selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Ethacryl™ G (Coatex, Arkema Group, France), Acumer™ 1051 (Rohm and Haas, U.K.), Sika® ViscoCrete®-2520 (Sika, Germany) or Sika® ViscoCretek®-20 HE (Sika, Germany). Suitable plasticizers are commercially available products. Component A may comprise at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 8 wt.-% of said plasticizer, based on the total weight of component A.

In an advantageous embodiment, component A further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelko, USA), starched-derived ethers, guar-derived ethers, cellulose-derived ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.5 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France), Ebotec MB 150 and Nuosept OB 03 (Ashland, The Netherlands). Component A comprises at least about 0.001 wt.-%, preferably at least about 0.005 wt.-%, more preferably at least about 0.01 wt.-%, most preferably at least about 0.02 wt.-%, from about 0.001 wt.-% to about 1.5 wt.-%, preferably from about 0.005 wt.-% to about 0.1 wt.-%, more preferably from about 0.01 wt.-% to about 0.075 wt.-%, most preferably from about 0.02 wt.-% to about 0.03 wt.-% of said antibacterial or biocidal agent, based on the total weight of component A. In a preferred embodiment, component A comprises from about 0.02 wt.-% to about 0.03 wt.-% of Nuosept OB 03, based on the total weight of component A.

Component A may comprises at least one filler, in particular an inorganic or mineral filler. The filler which can be used in the present invention may be selected from the group consisting of coarse quartz, quartz powder, preferably quartz powder having an averaged grain size (d50%) of about 16 µm, quartz sand, clay, fly ash, fumed silica, carbonate compounds, aluminas, pigments, titanium oxides, light fillers, corundum, and their mixtures. Suitable mineral fillers are commercially available products. Exemplarily mentioned is quartz powder Millisil W12 or W6 (Quarzwerke GmbH, Germany), quartz sand F32 (Quarzwerke GmbH, Germany), or Sewper Aggregates, such as SewperCoat® (Kerneos S.A, France). Component A may comprise at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 25 wt.-% of said at least one filler, based on the total weight of component A.

The water content comprised in component A is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of component A.

The presence of a plasticizer, thickening agent as well as an antibacterial or biocidal agent does not change the overall inorganic nature of the cementitious component A.

Component A comprising the aluminous cement or calcium sulfoaluminate cement is present in aqueous-phase, preferably in form of a slurry or paste.

Component B of the present invention comprises an initiator, at least one retarder, at least one mineral filler and water. To ensure a sufficient processing time, whereby the initial-set time is at least 5 min or more, at least one retarder, which prevents premature hardening of the mortar composition, is used in a distinct concentration in addition to the initiator component.

The initiator present in component B is comprised of an activator component and an optionally an accelerator component, which comprise a mixture of alkali and/or alkaline earth metal salts.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the lithium hydroxide used in component B is a 10% aqueous solution of lithium hydroxide.

Component B comprises at least about 0.5 wt.-%, preferably at least about 1 wt.-%, more preferably at least about 5 wt.-%, most preferably at least about 10 wt.-%, from about 0.5 wt.-% to about 40 wt.-%, preferably from about 1 wt.-% to about 35 wt.-%, more preferably from about 5 wt.-% to about 30 wt.-%, most preferably from about 10 wt.-% to about 25 wt.-% of said activator, based on the total weight of component B. In a particular preferred embodiment, the activator is comprised of water and lithium hydroxide. The water content comprised in component B is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of component B. The lithium hydroxide content comprised in component B is at least about 0.5 wt.-%, preferably at least about 1 wt.-%, more preferably at least about 2 wt.-%, most preferably at least about 3 wt.-%, from about 0.5 wt.-% to about 5 wt.-%, preferably from about 1.0 wt.-% to about 4 wt.-%, more preferably from about 1.5 wt.-% to about 3 wt.-%, most preferably from about 2 wt.-% to about 2.5 wt.-%, based on the total weight of component B. In a most preferred embodiment, component B comprises from about 10 wt.-% to about 35 wt.-% of a 10% aqueous solution of lithium hydroxide, based on the total weight of component B. In another most preferred embodiment, component B comprises from about 1 wt.-% to about 5 wt.-% of a 10% aqueous solution of sodium hydroxide, based on the total weight of component B. In alternative embodiment, component B may comprise 0 wt.-% activator as long as there is sufficient enough accelerator present, such for example lithium sulfate, which can act as an activator.

The optional accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium carbonate, lithium chloride, lithium formate, lithium citrate or lithium phosphate, most preferably is lithium sulfate. Component B comprises at least about 1 wt.-%, preferably at least about 2 wt.-%, more preferably at least about 4 wt.-%, most preferably at least about 5 wt.-%, from about 1 wt.-% to about 25 wt.-%, preferably from about 2 wt.-% to about 20 wt.-%, more preferably from about 4 wt.-% to about 15 wt.-%, most preferably from about 5 wt.-% to about 10 wt.-% of said accelerator, based on the total weight of component B.

In a particular preferred embodiment of component B of the present invention, the ratio of 10% aqueous solution of lithium hydroxide/lithium sulfate is 7/1.

The at least one retarder comprised in component B according to the present invention is selected from the group consisting of citric acid, tartaric acid, lactic acid, salicylic acid, gluconic acid and mixtures thereof, preferably is a mixture of citric acid and tartaric acid. Component B comprises at least about 1 wt.-%, preferably at least about 2 wt.-%, more preferably at least about 4 wt.-%, most preferably at least about 5 wt.-%, from about 1 wt.-% to about 25 wt.-%, preferably from about 2 wt.-% to about 15 wt.-%, more preferably from about 4 wt.-% to about 15 wt.-%, most preferably from about 5 wt.-% to about 10 wt.-% of said retarder, based on the total weight of component B.

In a particular preferred embodiment of component B of the present invention, the ratio of citric acid/tartaric acid is 1.6/1.

The at least one mineral filler comprised in component B according to the present invention is selected from the group consisting of limestone fillers, sand, crushed stones, gravels, pebbles and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B is most preferably a calcium carbonate or a mixture of calcium carbonates. Component B comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of component B. The at least one mineral filler is chosen to obtain a particle size complementary to that of the aluminous cement. It is preferred that the at least one mineral filler has an average particle size of not more than 500 µm, more preferably of not more than 400 µm, most preferably not more than 350 µm.

In a particular preferred embodiment of the present invention, the at least one mineral filler comprised in component B is mixture of three different calcium carbonates, i.e. calcium carbonate fines, such as different Omyacarb® types (Omya International AG, Germany). Most preferably, the first calcium carbonate has an average particle size (d50%) of about 3.2 µm and a residue of 0.05% on a 45 µm sieve (determined according to ISO 787/7). The second calcium carbonate has an average particle size (d50%) of about 7.3 µm and a residue of 0.5% on a 140 µm sieve (determined according to ISO 787/7). The third calcium carbonate has an average particle size (d50%) of about 83 µm and a residue of 1.0% on a 315 µm sieve (determined according to ISO 787/7). In a particular preferred embodiment of component B of the present invention, the ratio of first calcium carbonate/second calcium carbonate/third calcium carbonate is 1/1.5/2.

In a particular preferred alternative embodiment of the present invention, the at least one mineral filler comprised in component B is mixture of three different quartz fillers. Most preferably, the first quartz filler is a quartz sand having an average particle size (d50%) of about 240 µm. The second quartz filler is a quartz powder having an average grain size (d50%) of about 40 µm. The third quartz filler is a quartz powder having an average grain size (d50%) of about 15 µm. In a particular preferred embodiment of component B of the present invention, the ratio of first quartz filler/second quartz filler/third quartz filler is 3/2/1.

In an advantageous embodiment, component B further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.3 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.3 wt.-% to about 1 wt.-% of said thickening agent, based on the total weight of component B.

The presence of a retarder and thickening agent does not change the overall inorganic nature of the cementitious component B.

Component B comprising the initiator and retarder is present in aqueous-phase, preferably in form of a slurry or paste.

It is preferred that the pH-value of component B is above 10, more preferably above 11 and most preferably is above 12, in particular in the range between 10 and 14, preferably between 11 and 13.

It is particular preferred that the proportions of water in the two components, namely component A and component B, are chosen so that the water to aluminous cement ratio (W/CAC) or water to calcium sulfoaluminate cement (W/CAS), in the product obtained by mixing components A and B is lower than 1.5, preferably between 0.3 and 1.2, most preferably between 0.3 and 0.8.

Moreover, it is particular preferred that the proportion of lithium in component B is chosen so that the lithium to aluminous cement ratio (Li/CAC) and lithium to calcium sulfoaluminate cement (Li/CAS), in the product obtained by mixing components A and B is lower than 0.01, preferably between 0.001 and 0.0075, most preferably between 0.0025 and 0.005.

Moreover, it is particular preferred that the proportion of retarder in component B is chosen so that the citric acid/tartaric acid to aluminous cement ratio and citric acid/tartaric acid to calcium sulfoaluminate cement, in the product obtained by mixing components A and B is lower than 0.5, preferably between 0.001 and 0.4, most preferably between 0.001 and 0.08.

Component A of the present invention may be prepared as follows: The phosphor-containing blocking agent is mixed with water, so that the pH-value of the resulting mixture is about 2. Plasticizer is added and the mixture homogenized. Aluminous cement, optionally calcium sulfate, and optionally mineral filler are premixed and added stepwise to the mixture whilst increasing the stirring speed, so that the pH-value of the resulting mixture is about 4. Finally, thickening agent and antibacterial/biocidal agent are added and mixed until complete homogenization of the mixture.

Component B of the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture.

Component A and B are present in aqueous phase, preferably in form of a slurry or paste. In particular, components A and B have a pasty to fluid aspect according to their respective compositions. In one preferred embodiment, component A and component B are in paste form thereby preventing sagging at the time of mixing the two components.

The weight ratio between component A and component B (NB) is preferentially comprised between 7/1 and 1/3, preferably is 3/1. Preferably the composition of the mixture comprises 75 wt.-% of component A and 25 wt.-% of component B.

The two-component system is of mineral nature, which is not affected by the presences of additional thickening agents of other agents.

The shelf life of the two-component system depends on the individual shelf life of each of the respective components, in particular component A as well as component B has a shelf life of at least six months at ambient temperature so as to protect the system from the storing and supply delays. Most preferably, component A and B are individually stable for at least six months. The component A and B were stored in tightly closed containers to avoid evaporation of water at 40° C. and checked for any changes in fluidity, homogeneity, whether sedimentation occurs, and pH-value after several time intervals. The properties of all components remained unaffected after 6 months, thus the shelf life is at least 6 months at 40° C.

It is preferred that the two-component inorganic injection mortar system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component mortar system, especially two-component inorganic injection mortar system, the volume ratio of cementitious component A to initiator component B is 1:1 to 7:1, preferably is 3:1.

After being produced separately, component A and component B are introduced into separate containers, from which they are ejected by means of mechanical devices and are guided through a mixing device. The two-component inorganic injection mortar system of the present invention is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

The hardening aluminous cement composition existing from the static mixer is inserted directly into the borehole, which is required accordingly for fastening the anchoring means, and has been initially introduced into the mineral substrate, during the chemical fastening of anchoring means, whereupon the construction element to be fastened, for example an anchor rod, is inserted and adjusted, whereupon the mortar composition sets and hardens. In particular, the two-component system of the present invention is to be considered as a chemical anchor for fastening metal elements.

The two-component inorganic injection mortar system of the present invention can be used for chemical fastening of anchoring means, preferably of metal elements, such as anchor rods, in particular threaded rods, bolts, steel reinforcement bars or the like into mineral substrates, such as structures made of brickwork, concrete, pervious concrete or natural stone. In particular, the two-component inorganic injection mortar system of the present invention can be used for chemical fastening of anchoring means, such as metal elements, in boreholes. It can be used for anchoring purposes encompassing an increase in the load capacity at temperatures above room temperature or at elevated temperatures, such as above 80° C., and/or encompassing an increase in the bond stress in the cured state. An increased temperature resistance results in a better operational capability for anchoring purposes also at higher temperatures, such as temperatures being present in the area of a borehole of facade anchorages, which are exposed to strong sunlight or otherwise elevated temperatures.

Moreover, the two-component inorganic injection mortar system comprising calcium aluminate cement having an average particle size in the range of from 0.5 to 15 µm of the present invention may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchoring means, preferably metal elements, such as anchor rods, in particular threaded rods, bolts, steel reinforcement bars or the like into recesses, such as boreholes, in mineral substrates, such as structures made of brickwork, concrete, pervious concrete or natural stone, whereby the components of the two-component inorganic injection mortar system of the present invention are prior mixed, for example by means of a static mixer or by destroying a cartridge or a plastic bag, or by mixing components of a multi-chamber pails or sets of buckets.

The following example illustrates the invention without thereby limiting it.

Examples

1. Preparation of Component A and Component B

The liquid slurries (cementitious compound A and initiator compound B) of the inventive examples 2 to 5 and the comparative example 1 were produced according to the following procedures:

Component A:

17.55 grams deionized water, 2.72 grams of 85% phosphoric acid (blocking agent), 0.5 grams xanthan gum (thickener), 0.6 grams Ethacryl G® (superplasticizer), and 0.19 grams Nuosept® (biocide) were homogenized at room temperature, and whilst stirring with a dissolver, the calcium aluminate cement (either pure Ternal White® [comparative example 1] or premixed according to Table 1 [inventive examples 2 to 5]) is added in subsequent small portions, to obtain finally a smooth, liquid pasty slurry of the blocked cement in water, the pH being below 7. The composition of the different A-components A0 to A4 only differs in the composition of the CAC compound as follows (wt.-%:wt.-%):

TABLE 1

| Composition of component A. | | | | | |
|---|---|---|---|---|---|
| Component A | A0 | A1 | A2 | A3 | A4 |
| Ternal White [1] | 100 | 90 | 75 | 50 | 25 |
| Fine Ternal White [2] | 0 | 10 | 25 | 50 | 75 |

[1] Ternal White ® is a commercial calcium aluminate cement from Kerneos SA, France, with an average particle size $d_{50}$ of 21 µm;
[2] By grinding Ternal White ® by a suitable process, e.g. in a ball mill, a "fine Ternal White" - fine calcium aluminate cemenet having an average particle size $d_{50}$ of 6 µm was obtained.

Component B:

In 16.59 grams 10% aqueous LiOH-solution (activator), 2.28 grams of citric acid and 1.42 grams of tartaric acid (retarder), 2.14 grams of Ecodis® P50 (superplasticizer), and 0.43 grams Optigel® WX (thickener) ware dissolved. Whilst stirring with a dissolver, 77.15 grams of a mixture of the following calcium carbonate fillers was added in subsequent portions: 35.3 grams Omyacarb® 130 AL, 24.13 grams Omyacarb® 15H AL, 17.72 grams Omyacarb® 2 AL, to obtain finally a smooth, liquid pasty slurry of the calcites in water, the pH being above 11.

2. Determination of Mechanical Performance as Chemical Anchors

Components A0 to A4, respectively and component B were separately filled into side-by-side cartridges with a volume ratio A:B=1:3 and dispensed through a static mixer into hammer drilled boreholes in concrete C20/25 with borehole diameter 14.0 mm. Different borehole conditions were tested with two curing times:

"Ref" refers to dry concrete, well cleaned borehole by repeated brushing/blowing out with compressed air;

"F1a" refers to dry concrete, only partly cleaned borehole by blowing out the drilling dust, no brushing;

"F1b" refers to water saturated concrete, only partly cleaned borehole by blowing out the drilling dust, no brushing.

Per condition, 5 boreholes were tested, by inserting threaded steel rods with size M12, 72 mm embedment depth immediately after injection of the mixture, and after 24 hours and seven days, the anchors were pulled out by a centric pull-out test under narrow confinement, and the normal bond strength at failure was detected, resulting in the following data (Table 2.1 and 2.2):

TABLE 2.1

Bond strengths in N/mm² after 24 hours.

| | Example | | | | | | | | |
|---|---|---|---|---|---|---|---|---|---|
| | Comparative example 1 A0 + B | | | Inventive example 2 A1 + B | | | Inventive example 3 A2 + B | | |
| Condition | Ref | F1a | F1b | Ref | F1a | F1b | Ref | F1a | F1b |
| N/mm² | 8.3 | 7.7 | 8.9 | 11.4 | 10.5 | 9.6 | 13.0 | 11.1 | 11.3 |
| | Example | | | | | | | | |
| | Inventive example 4 A3 + B | | | Inventive example 5 A4 + B | | | | | |
| Condition | Ref | F1a | F1b | Ref | F1a | F1b | | | |
| N/mm² | 14.2 | 13.2 | 14.2 | 13.2 | 14.2 | 13.2 | | | |

TABLE 2.2

Bond strengths in N/mm² after 7 days.

| | Example | | | | | | | | |
|---|---|---|---|---|---|---|---|---|---|
| | Comparative example 1 A0 + B | | | Inventive example 2 A1 + B | | | Inventive example 3 A2 + B | | |
| Condition | Ref | F1a | F1b | Ref | F1a | F1b | Ref | F1a | F1b |
| N/mm² | 11.9 | 11.7 | 12.7 | 16.9 | 15.2 | 15.7 | 18.5 | 16.8 | 16.6 |
| | Example | | | | | | | | |
| | Inventive example 4 A3 + B | | | Inventive example 5 A4 + B | | | | | |
| Condition | Ref | F1a | F1b | Ref | F1a | F1b | | | |
| N/mm² | 19.8 | 19.1 | 17.6 | 18.6 | 19.0 | 17.6 | | | |

As it can be seen from Tables 2.1 and 2.2, all inventive systems show considerably increased bond strengths in comparison to the comparative system 1 with the initial product Ternal White®, which is a calcium aluminate cement having an average particle size of 21 μm, which was not milled by the manufacturer, meaning which does not comprise any calcium aluminate cement having an average particle size in the range of from 0.5 to 15 μm. Further, in all cases, a pronounced post-cure effect during the first week can be seen. All systems behave very robust against detrimental borehole conditions (comparison "Ref" versus "F1a" and "F1b"), so the addition of the calcium aluminate cement having an average particle size in the range of from 0.5 to 15 μm significantly increases the mechanical properties without infringing the curing behavior or the robust properties of the two-component cementitious injection system.

As it has been shown above, the use of ≥10 wt.-% of calcium aluminate cement having an average particle size in the range of from 0.5 to 15 μm, based on the total weight of the aluminous cement, preferably with an average particle size $d_{50}$ below 10 μm provides an increase in load values and hence mechanical strength when compared to systems not comprising any fine calcium aluminate cement, i.e. a calcium aluminate cement having an average particle size in the range of from 0.5 to 10 μm.

The invention claimed is:

1. A two-component inorganic injection mortar system, comprising:
    a curable aqueous-phase aluminous cement component A and an initiator component B in an aqueous-phase for initiating a curing process,
    wherein component A further comprises at least one plasticizer, water, and at least one blocking agent selected from the group consisting of phosphoric acid, metaphosphoric acid, phosphorous acid and phosphoric acids,
    wherein component B comprises an initiator, at least one retarder, at least one mineral filler and water, and
    wherein the curable aqueous-phase aluminous cement component A comprises calcium aluminate cement having an average particle size in a range of from 0.5 to 15 μm.

2. The two-component inorganic injection mortar system according to claim 1, wherein the calcium aluminate cement having an average particle size in the range of from 0.5 to 15 μm is present in a range of from 10 to 90 wt.-%, based on the total weight of the aluminous cement.

3. The two-component inorganic injection mortar system according to claim 1, wherein
    i) the initiator comprises a mixture of alkali and/or alkaline earth metal salts, ii) the at least one retarder is selected from the group consisting of citric acid, tartaric acid, lactic acid, salicylic acid, gluconic acid and mixtures thereof, and iii) the at least one mineral filler is selected from the group consisting of limestone fillers, sand, corundum, dolomite, alkaline-resistant glass, crushed stones, gravels, pebbles and mixtures thereof.

4. The two-component inorganic injection mortar system according to claim 1, wherein the initiator comprises a mixture of lithium salts and/or sodium salts.

5. The two-component inorganic injection mortar system according to claim 1, wherein the at least one retarder is citric acid, tartaric acid or a mixture thereof.

6. The two-component inorganic injection mortar system according to claim 1, wherein component A and component B are in form of a slurry or paste.

7. A method, comprising:
chemical fastening of an anchor in a mineral substrate with the two-component inorganic injection mortar system according to claim 1.

8. The method according to claim 7, wherein the anchor is selected from the group consisting of an anchor rod, threaded anchor rod, a bolt and a steel reinforcement bar.

9. The method according to claim 7, wherein the mineral substrate is a structure made of brickwork, concrete, pervious concrete or natural stone.

10. A method of increasing a load value in fastening an anchor and/or a post-installed reinforcing bar in a mineral substrate with the inorganic injection mortar system of claim 1, the method comprising:
incorporating, as component A in the mortar system, a calcium aluminate cement having an average particle size in a range of from 0.5 to 15 μm, and
chemical fastening the anchor and/or post-installed reinforcing bar in the mineral substrate with the inorganic injection mortar system.

11. The method according to claim 10, wherein the calcium aluminate cement having an average particle size in the range of from 0.5 to 15 μm is present in a range of from 10 to 90 wt.-%, based on total weight of the aluminous cement.

12. The method according to claim 10, wherein the initiator component B comprises a mixture of alkali and/or alkaline earth metal salts,
wherein the at least one retarder is selected from the group consisting of citric acid, tartaric acid, lactic acid, salicylic acid, gluconic acid and mixtures thereof, and
wherein the at least one mineral filler is selected from the group consisting of limestone fillers, sand, corundum, dolomite, alkaline-resistant glass, crushed stones, gravels, pebbles and mixtures thereof.

13. The method according to claim 10, wherein the anchor and/or post-installed reinforcing bar comprises an anchor rod, threaded anchor rod, bolt or steel reinforcement bar.

14. A method for chemical fastening of anchors and post-installed reinforcing bars in mineral substrates, the method comprising:
chemical fastening of an anchor or post-installed reinforcing bar in a mineral substrate with an inorganic injection mortar system, which comprises a curable aluminous cement component A and an initiator component B for initiating a curing process,
wherein component A further comprises at least one blocking agent, at least one plasticizer and water, and
wherein component B comprises an initiator, at least one retarder, at least one mineral filler and water, and
wherein the mortar system contains calcium aluminate cement having an average particle size in a range of from 0.5 to 15 μm.

* * * * *

UNITED STATES PATENT AND TRADEMARK OFFICE
CERTIFICATE OF CORRECTION

PATENT NO. : 11,718,564 B2
APPLICATION NO. : 17/283608
DATED : August 8, 2023
INVENTOR(S) : Armin Pfeil et al.

It is certified that error appears in the above-identified patent and that said Letters Patent is hereby corrected as shown below:

In the Claims

Column 14, Line 51, Claim 1, currently reads, "phosphorous acid and phosphoric" and should read --phosphorous acid and phosphonic--.

Signed and Sealed this
Second Day of January, 2024

Katherine Kelly Vidal
Director of the United States Patent and Trademark Office